Aug. 13, 1929.　　　F. J. PROWSE　　　1,724,515
METHOD OF AND APPARATUS FOR BLENDING AND MIXING DRIED FRUIT
Filed Dec. 13, 1927
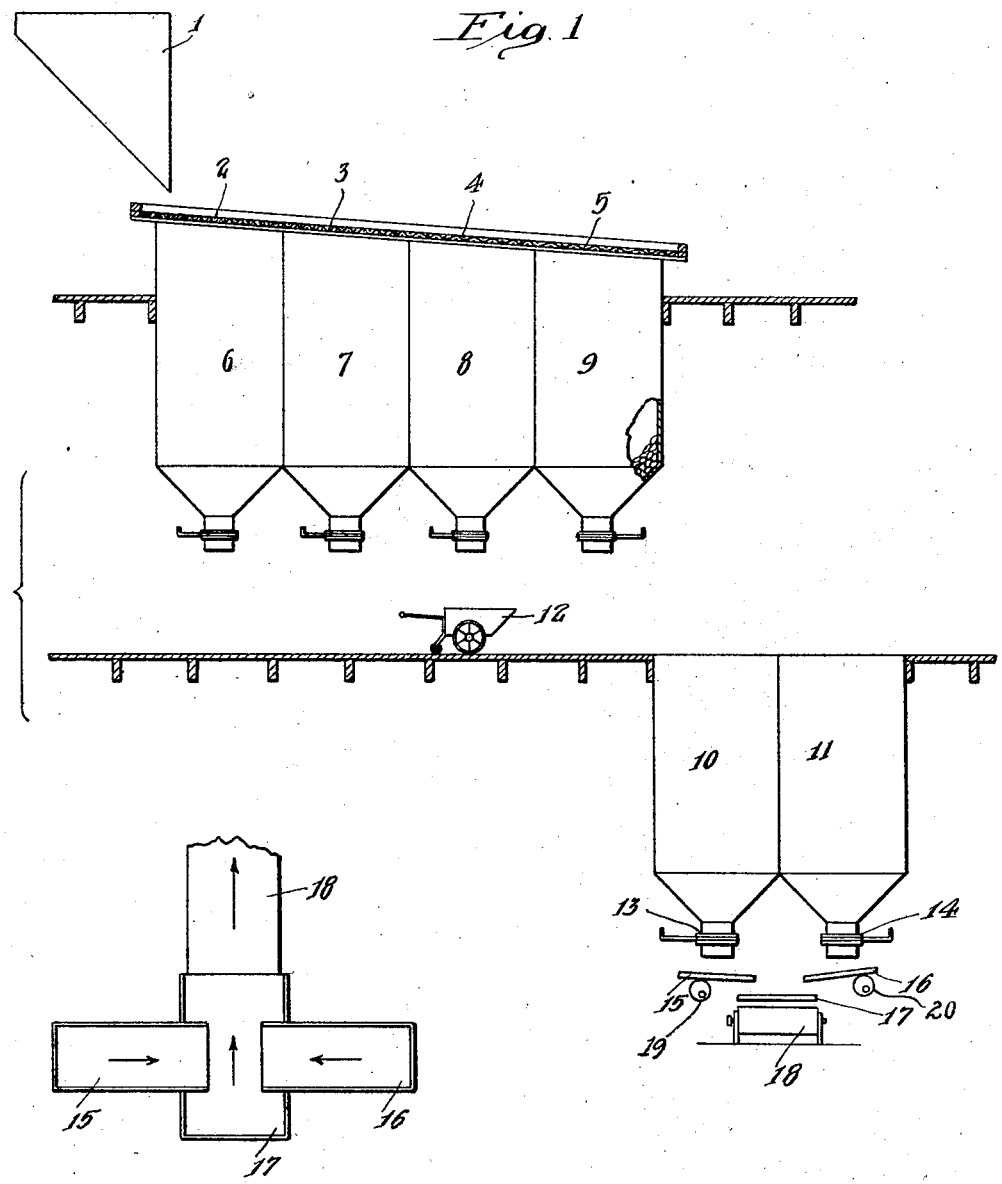

Patented Aug. 13, 1929.

1,724,515

UNITED STATES PATENT OFFICE.

FRANCIS J. PROWSE, OF SAN JOSE, CALIFORNIA, ASSIGNOR TO CALIFORNIA PACKING CORPORATION, OF SAN FRANCISCO, CALIFORNIA, A CORPORATION OF NEW YORK.

METHOD OF AND APPARATUS FOR BLENDING AND MIXING DRIED FRUIT.

Application filed December 13, 1927. Serial No. 239,746.

This invention relates to a novel apparatus for mixing and blending fruit whereby various grades of fruit may be intimately mixed without injury to the fruit and with the minimum expenditure of time and labor and is particularly for use with such dried fruit as will not readily roll or flow, such as dried prunes.

An object is to provide an apparatus whereby predetermined quantities of fruit of different grades may be intimately mixed and blended. Another object is to provide an apparatus for breaking up agglomerates of fruit and mixing various grades of fruit so as to produce intermediate grades.

Further objects and advantages of this invention will become apparent from the detailed description of the apparatus and method which follows. It is to be understood, however, that this invention is not to be limited to the specific examples or constructions described as various modifications and changes may be made without departing from the spirit or scope of the invention.

Various kinds of fruit are graded according to size in the fruit industry and dried fruit, such as prunes, is usually sold on the market in grades corresponding to the number of prunes per unit of weight. For example, prunes are usually graded according to size and further blended so that the commercial grades are referred to as being 20–30, 30–40, 40–50, 50–60, 60–70, 70–80, 80–90, 90–100 and 100–120, these numbers indicating the range or number of prunes per unit of weight, such unit being generally one pound. In order to prepare these grades, prunes are first separated into various grades, such separation being usually effected by means of screens so that the grades represent prunes of a certain size and therefore a certain number of these prunes will make up a unit weight. In view of the fact that a much greater demand may exist for prunes of one certain grade than for other grades it is economically desirable to blend the screened prunes so as to make up an intermediate grade of the character required. In other words, a 50–60 grade of prunes sold on the market is generally a blend of larger and smaller prunes in such proportion that between 50 and 60 prunes of the final grade make up one pound of such fruit. This blending operation enables the fruit packer to utilize practically all sizes of prunes without wasting, storing or accumulating large quantities of prunes of a specific size which may not be particularly desired by the trade during certain seasons or periods of time.

Heretofore blending or mixing as described above has been carried out manually at a considerable expense. Before my invention prunes from bins containing fruit sorted by the screens or other sizing devices were shoveled manually into a common stream or bin. For example, one man would be utilized in shoveling prunes from one bin and another man would be utilized in shoveling prunes from a separate bin, the number of shovels of each grade of prunes being proportioned so as to give a mix of the required count per unit weight, for example, one shovelful of about grade 20–30 and three shovelfuls of about grade 50–60. This operation, carried out in this primitive fashion is slow and requires a frequent change of labor, thereby increasing the cost of the blending operation. Automatic blending devices have heretofore been tried, but have been so complex and expensive that they have not proven practical.

In accordance with my invention blending and mixing of the dried fruit is carried out automatically with a minimum expenditure of labor and with minimum injury to the fruit. The apparatus embodied in my invention is relatively simple, inexpensive and not only proportions different original grades of fruit in predetermined and required amounts for blending or mixing, but simultaneously breaks agglomerates of the fruit so that an intimate and thorough mixture is assured.

Reference will be made to the accompanying drawings embodying one form of my invention.

Figure 1 is a diagrammatic elevation of a plant and apparatus adapted to sort and blend dried fruit, such as prunes.

Figure 2 is a plan view of one form of blending machine embodied in this invention.

In the drawings, 1 indicates a hopper into which the prunes received from the grower are first placed. These prunes then pass through a sizing or grading device, for example, over a series of vibrating or oscillating screens 2, 3, 4 and 5. These screens may be of any suitable size or shape, but if vibrating screens are used they are placed in series and at a slight angle with the horizontal so that the prunes will roll over such screen or be conveyed thereby from the feed and to a discharge end. The screens are of increasing coarseness, that is, the size of the openings in the screens increases progressively, small prunes thereby passing through the screen 2 and the largest prunes passing through screen 5. Any required number of screens may be used and, therefore, any desired number of gradations made in the fruit.

Prunes passing through the screen may be stored in bins or hoppers 6, 7, 8 and 9 or if desired, such sorted prunes may be conveyed to separate storage receptacles. The prunes sorted according to size at this point are available for blending to provide the salable grade or grades at the time of call.

In accordance with my invention blending and mixing of these different grades is accomplished in two or more separate temporary receiving bins or hoppers such as 10 and 11 which are preferably mounted so that prunes from suitable hoppers, such as 6 and 8 for example, may be conveyed by means of a cart 12 or any other suitable conveyor from bins 6 and 8 to the bins 10 and 11 respectively. Bins or hoppers 10 and 11 are preferably equipped with adjustable outlets 13 and 14 adapted to discharge predetermined quantities of fruit from each bin. Fruit discharged from these outlets then falls upon suitable conveyors 15 and 16 feeding toward each other so as to discharge at a common point, or into a common stream. Preferably, conveyors 15 and 16 are of the vibratory or oscillating type having a differential motion which causes the prunes to drop off the opposed edges of the conveyors 15 and 16. For purposes of illustration the conveyors 15 and 16 have been provided with cams 19 and 20 mounted on suitable shafts and driven by means (not shown) which may impart a vibrating motion to the conveyors. These conveyors may be of any suitable construction capable of a shaking, vibratory or oscillating motion. During the period of time that prunes from bins 10 and 11 are on the shakers and conveyors 15, and 16, agglomerates are broken up so that the individual fruit discharged upon the common mixing table or conveyor 17 are not adhering to each other. This facilitates the final mixing or blending upon the mixing table 17. The mixing table 17 is preferably another vibrating, oscillating or shaking conveyor capable of thoroughly mixing the prunes or other fruit being fed thereon by conveyors 15 and 16. Additional mixing may be accomplished upon the table conveyor 17 by manual labor or additional devices (not shown). Mixing table 17 may then discharge the blended fruit onto a conveyor, elevator or other suitable device 18 which carries off the blended fruit into other portions of the plant for processing or packing. These further operations are not indicated on the drawing as they have no bearing upon my invention, and are well known in the art.

It will be seen, therefore, that different grades of prunes or other dried fruit may be placed into the bins 10 and 11 and proportional quantities of fruit in predetermined ratio discharged from each bin, such proportional discharge being regulated by the adjustable outlets 13 and 14 and controlled by the operator as desired in view of the original size of prunes or other fruit being blended, and the final grade desired. This operation regulates the blending of fruit by proportioning by volume and although automatic weighing devices such as poidometers may be used, in place of the shaker screens 15 and 16, so as to proportion by weight and convey to a common point, the use of such poidometer conveyors is not recommended as they are incapable of imparting the agitating and vibrating motion to the dried fruit so as to break up agglomerates.

If desired, the vibrating conveyors 15 and 16 may be positioned beneath two or more of the storage bins 6, 7, 8 or 9 and the use of the temporary hoppers 10 and 11 discarded, provided such storage bins such as 6, 7, 8 or 9 are equipped with individual adjustable outlet means such as 13 adapted to regulate the quantity of fruit discharged. This and further modifications of my method and apparatus may be utilized in accordance with operating conditions, construction and arrangement of individual plants.

The invention provides a new and improved means of large capacity and simplest construction. It has been put to practical use with definite commercial success.

I claim:

1. An apparatus for blending dried fruit comprising separate feeding hoppers adapted to receive separate grades of fruit, adjustable outlet means at the lower end of each hopper, and means for vibrating and conveying fruit from said separate hoppers to a common mixing point.

2. An apparatus for blending prunes comprising, separate bins adapted to receive prunes of different grades, adjustable outlet means at the lower end of each bin adapted to discharge predetermined quantities of prunes from each bin, means for conveying prunes from each bin to a common mixing table and simultaneously agitating the prunes so as to break up agglomerates.

3. An apparatus for blending prunes comprising, separate bins adapted to receive prunes of different sizes, adjustable outlet means at the lower end of each bin for regulating volume of discharge from each bin, means for simultaneously agitating and conveying prunes from each bin to a common mixing table and a common mixing and shaking device adapted to receive prunes from said conveyors.

4. The method of blending dried fruit comprising separating fruit according to kind in separate storage bins, then continuously discharging predetermined quantities of fruit from separate bins, breaking up agglomerates present in fruit discharged from separate bins, and then mixing said discharged fruit.

5. The method of blending fruit comprising separating fruit according to size in separate storage bins, then continuously discharging predetermined quantities of fruit from separate bins, breaking up agglomerates present in fruit discharged from separate bins, and then mixing said discharged fruit.

Signed at San Jose, Calif., this 7th day of Dec., 1927.

FRANCIS J. PROWSE.